United States Patent [19]

Himuro et al.

[11] Patent Number: 4,717,931
[45] Date of Patent: Jan. 5, 1988

[54] FAIL-SAFE FILM PREWINDER FOR CAMERAS

[75] Inventors: Keiji Himuro, Kanagawa; Akira Ueno, Tokyo, both of Japan

[73] Assignee: Ricoh Company, Ltd., Tokyo, Japan

[21] Appl. No.: 876,398

[22] Filed: Jun. 20, 1986

[30] Foreign Application Priority Data

Jun. 26, 1986 [JP] Japan .................. 60-139850

[51] Int. Cl.⁴ .................. G03B 1/00
[52] U.S. Cl. .................. 354/173.1; 354/214
[58] Field of Search .................. 354/173.1, 173.11, 214

[56] References Cited

U.S. PATENT DOCUMENTS 4,400,074 8/1983 Akiyama et al. .................. 354/214 X
4,460,256 7/1984 Araki et al. .................. 354/214 X
4,494,842 1/1985 Kimura et al. .................. 354/173.11

Primary Examiner—W. B. Perkey
Attorney, Agent, or Firm—Oblon, Fisher, Spivak, McClelland, & Maier

[57] ABSTRACT

A fail-safe film prewinder for a camera. The prewinder has a mode switch which can be changed over by switching to a photographing mode upon completion of a prewinding mode in which a film is continuously pulled or prewound from a film cartridge loaded in the camera. When the mode switch is in the prewinding mode position while a shutter release button is being operated, a film transport motor is rotated in the direction to prewind the film again after an interruption of the prewinding mode.

4 Claims, 5 Drawing Figures

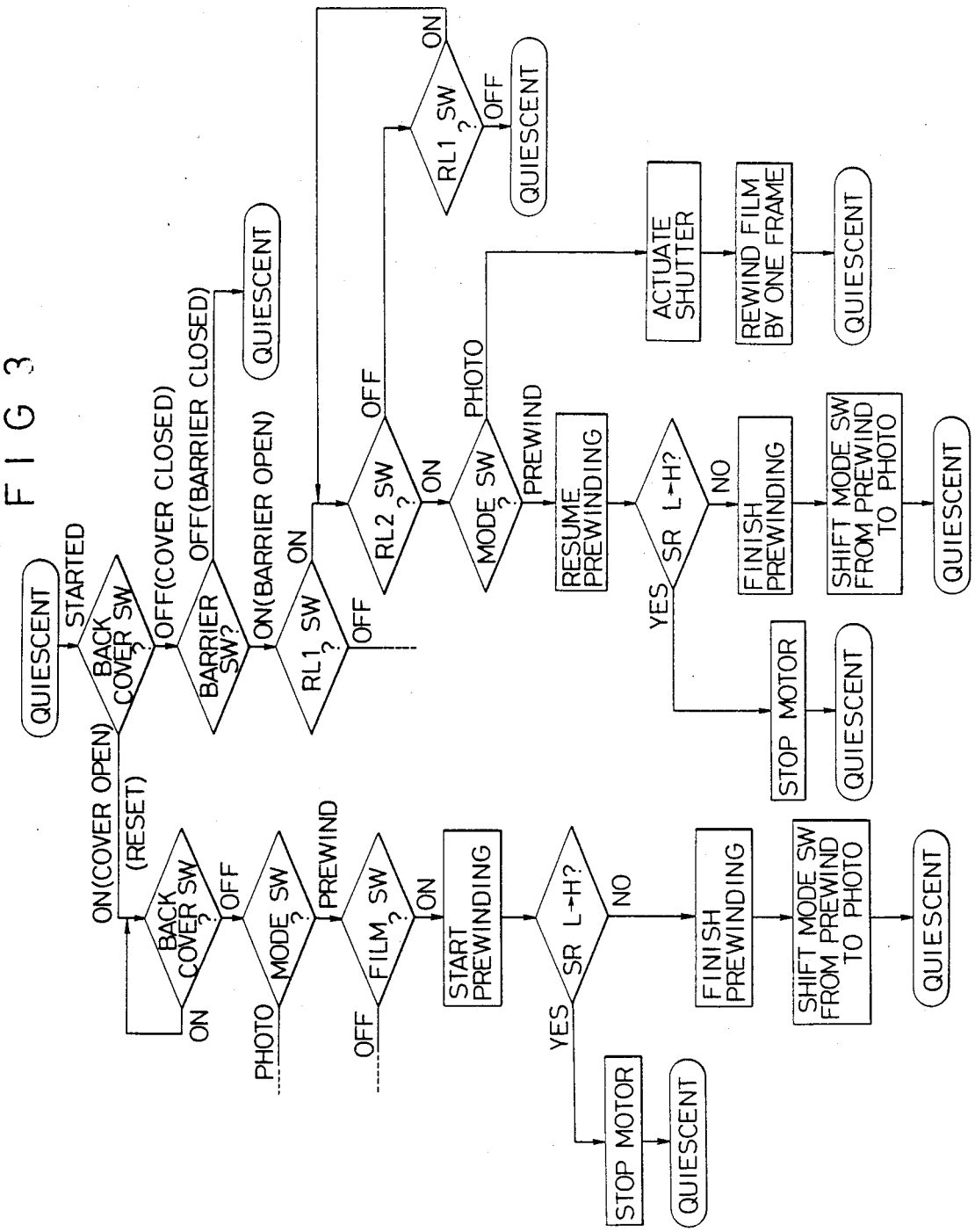

FAIL-SAFE FILM PREWINDER FOR CAMERAS

BACKGROUND OF THE INVENTION

1. Field of the Invention

The present invention relates to a film prewinder for cameras which includes a fail-safe system for automatically prewinding a film again or resuming a film prewinding mode without having to open the camera back cover in the event of a film prewinding failure.

2. Discussion of the Background

There is known a camera with a film prewinding mechanism which is powered by a battery assocated with the camera. When a film cartridge is loaded in the camera, the film prewinding mechanism pulls substantially all of the film continuously out of the cartridge. Then, the film is rewound back one frame at a time into the cassette as the film frames are successively exposed.

When the film prewinding mechanism is in operation, it must be energized continuously by the battery since the relatively long film must be pulled out of the cartridge without interruption. However, if the battery has already been consumed or is not powerful enough due for example to a low temperature, the film prewinding mechanism may be stopped while the film is being prewound. Where the camera is controlled by a sequence control circuit incorporated therein, the operation sequence is brought to an end upon interruption of the film prewinding process due to a power failure. Once this sequence interruption occurs, the sequence control circuit does not start the film prewinding mode again even if the battery restores its desired power supply capability. For restarting the sequence process, therefore, it is necessary to open the camera back cover, remove the cartridge, replace the battery with a new battery to initialize the sequence control circuit, and then load the cartridge again to start prewinding the film once more.

SUMMARY OF THE INVENTION

In view of the aforesaid problems of the conventional camera with a film prewinding mechanism, it is an object of the present invention to provide a fail-safe film prewinder for cameras which, in the event of interruption of film prewinding due to a battery power failure, enables the film to be prewound again without having to open the camera back cover, based on the recovery of the battery power supply capability with time or as the temperature increases.

According to the present invention, there is provided a fail-safe film prewinder for a camera, comprising a film transport motor rotatable in opposite directions for selectively transporting a film out of and into a film cartridge, a mode switch which can be changed over by switching to a photographing mode upon completion of a prewinding mode, a shutter release switch actuatable in response to the depression of a shutter release button, and a motor controller for controlling the film transport motor to rotate in the direction to prewind the film out of the film cartridge when the mode switch is in a prewinding position while the shutter release switch is being actuated by the shutter release button.

With this arrangement, even when the prewinding of the film is interrupted due for example to a battery power failure, the film can thereafter be prewound again simply by depressing the shutter release button without having to open the camera back cover. The operation sequence for the camera is not stopped when the film prewinding mode is interrupted. Therefore, it is not necessary to open the camera back cover, remove the film, and replace the battery with a new one, before the film is prewound again and exposures are subsequently made on the film. Where the camera has a sequence control circuit, the film prewinder can easily be implemented by software without adding a special circuit arrangement.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flowchart of operation of the fail-safe film prewinder;

DESCRIPTION OF THE PREFERRED EMBODIMENT

Figure 1:
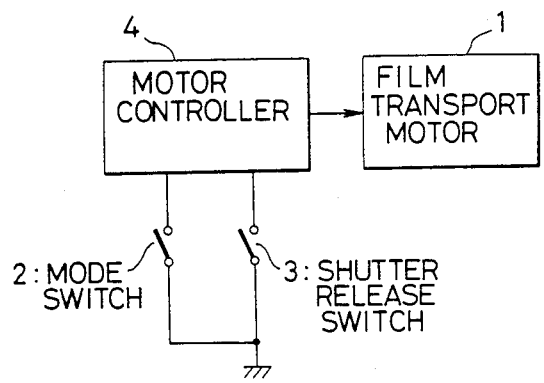
FIG. 1 is a block diagram of a fail-safe film prewinder according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows, a fail-safe film prewinder for a camera according to the present invention as generally comprising a reversible film transport motor 1 rotatable in opposite directions for selectively transporting a film out of and into a film cartridge, a mode switch 2 which can be changed over by switching to a photographing mode upon completion of a prewinding mode, a shutter release switch 3 actuatable in response to the depression of a shutter release button, and a motor controller for controlling the film transport motor to rotate in the direction to prewind the film out of the film cartridge when the mode switch 2 is in a prewinding position while the shutter release switch 3 is being actuated by the shutter release button.

Figure 2:
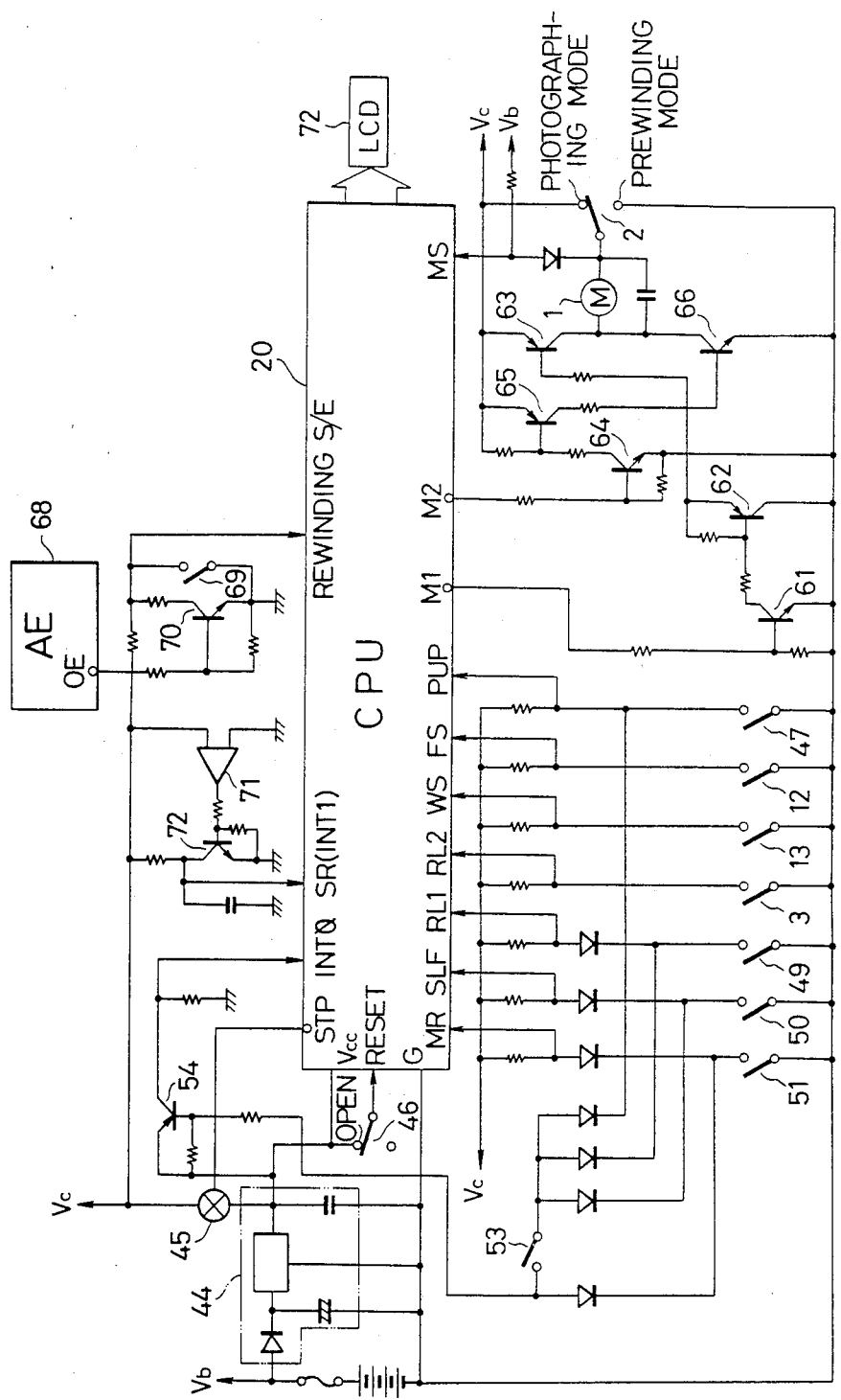
FIG. 2 is a circuit diagram of the fail-safe film prewinder of the present invention.

FIG. 2 shows a sequence control CPU (central processing unit) 20 for the camera, including the motor controller 4 illustrated in FIG. 1.

In FIG. 2, a power supply Vb has a voltage of 6 V, for example, and a regulated constant-voltage power supply circuit 44 is connected to the power supply Vb for providing a constant-voltage power supply Vcc having a voltage of 3 V, for example, to be supplied to the CPU 20. The constant-voltage power supply Vcc is taken as another power supply Vc through an analog switch 45 controlled by the CPU 20. A back cover switch 46, which is coupled between the constant-voltage power supply Vcc and the CPU 20, is changed over as shown in response to the opening of a camera back cover to apply a reset signal from the power supply Vcc to the CPU 20. When the camera back cover is closed, the back cover switch 46 applies no reset signal to the CPU 20.

A pop-up switch 47 is connected to the CPU 20 for applying a pop-up signal to the CPU 20. The pop-up signal is generated upon closing of the pop-up switch 47 when an electronic flash lamp pops up from the camera body. A film switch 12 connected to the CPU 20 is closed by detecting the film in the aperture of the camera. A film transport switch 13 also coupled to the CPU 20 is alternately closed and opened a given number of times when the film is transported by one frame in the camera. The film transport switch 13 may comprise a sprocket-like rotatable member disposed laterally of the film switch 12 in the aperture and having teeth positioned in a film passage and engaging in perforations of the film. As the film is transported in the camera, the sprocket-like rotatable member is rotated by the film to alternately close and open switch contacts. The shutter release switch 3 is connected to the CPU 20, and is closed when the shutter release button is fully depressed. A shutter release half-depression switch 49 connected to the CPU 20 is closed when the shutter release button is half depressed. A self-timer set switch 50 connected to the CPU 20 is closed when a self-timer is set. A rewinding switch 51 which is closed in a film rewinding mode is also joined to the CPU 20. When these switches 47, 12, 13, 3, 49, 50, 51 are closed, they apply their signals to the CPU 20 by rendering the corresponding input ports of the CPU 20 low in level. A barrier switch 53 is closed when a barrier in front of a camera lens is opened. When any one of the pop-up switch 47, the shutter release half-depression switch 49, and the self-timer set switch 50 is closed while the barrier switch 53 is being closed, a transistor 54 is turned on to apply a signal to an INT0 terminal of the CPU 20 to start operating the CPU 20. The CPU 20 can also be started when the rewinding switch 51 is closed.

The mode switch 2 doubles as a film cartridge detecting switch, and is in a photographing mode position when no film cartridge is loaded in the camera. When a film cartridge is loaded in the camera, the switch 2 is changed over to a prewinding mode position. When the film is substantially entirely pulled out of the film cartridge in the prewinding mode and then tensioned, the switch 2 is changed over again to the photographing mode position as shown.

Figure 4:
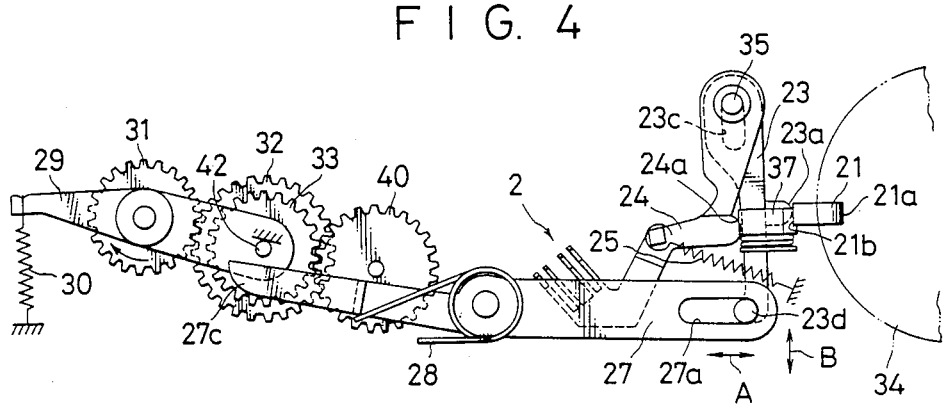
FIG. 4 is a plan view of a mode switch mechanism that can be employed in the fail-safe film prewinder of the invention.
Figure 5:
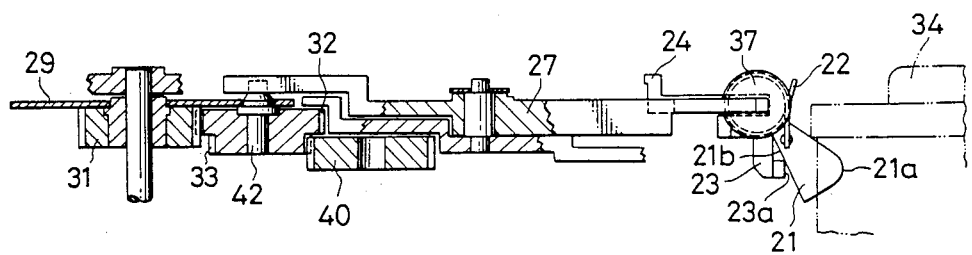
FIG. 5 is a side elevational view, partly in cross section, of the mode switch mechanism.

The mode/film cartridge detecting switch 2 may be constructed as disclosed in Japanese Utility Model Application No. 59(1984)-113214. FIGS. 4 and 5 show such a disclosed mode/film cartridge detecting switch.

In the position of the mechanism shown in FIGS. 4 and 5, no film cartridge is placed in a cartridge chamber of the camera. In this position, a cartridge lever 21 is normally urged by a spring 22 to be angularly moved to displace an end 21a thereof into the cartridge chamber. A clutch-operated lever 27 is normally urged by a spring 28 to be angularly moved, and a switch lever 24 is also normally urged by a spring 25 to be angularly moved to cause an end 24a thereof to push a cartridge-operated lever 23 so that its end 23a is held against a side 21b of the cartridge lever 21. With the switch lever 24 in this angularly moved position, the movable contact of the mode/film cartridge detecting switch 2, which is connected to the switch lever 24, is shifted to the photographing mode position for rewinding the film into the film cartridge. A lever 29 is normally urged by a spring 30 to be angularly moved for keeping gears 33, 40 in mesh with each other. A gear 31 rotatably supported on the lever 29 is operatively coupled to the output shaft of the film transport motor 1. The gear 31 is in mesh with a gear 32 coaxially integral with the gear 33, the gears 32, 33 being mounted by a shaft 42 on the lever 29.

When a film cartridge 34 is inserted into the cartridge chamber, the end 21a of the cartridge lever 21 is pushed by a peripheral surface of the film cartridge 34 to turn clockwise (FIG. 5) against the resilient forces of the spring 22. The end 23a of the cartridge-operated lever 23 is then pushed by the side 21b of the lever 21 to turn clockwise, pushing the end 24a of the switch lever 24 to cause the switch lever 24 to turn clockwise (FIG. 4) against the resiliency of the spring 25. The movable contact of the mode/film cartridge detecting switch 2 is now shifted to the prewinding mode position for rotating the film transport motor 1 in the direction to pull the film out of the film cartridge 34. When the film transport motor 1 is energized and the gear 31 is rotated clockwise in FIG. 4, the rotative power of the gear 31 is transmitted through the gears 32, 33, 34 to a film take-up spool in the camera for prewinding the film out of the film cartridge 34 onto the film take-up spool.

When the film prewinding is completed, the film transport motor 1 remains energized and tends to rotate. Since the terminal end of the film is fixed to the winding shaft in the film cartridge 34, however, the film is subjected to a large tension upon completion of the film prewinding. Therefore, the gear 40 is prevented from rotating, and the integral gears 32, 33 are subjected to forces from the motor 1, tending to move out of mesh with the gear 40. The lever 29 is now turned clockwise (FIG. 4) against the resiliency of the spring 30 until the rotative power to the gear 40 is shut off. The clockwise movement of the lever 29 causes the shaft 42 to push an arm end 27c of the clutch-operated lever 27 for thereby turning the lever 27 counterclockwise (FIG. 4) against the resilient forces of the spring 28. Now, one side edge of a slot 27a defined in the lever 27 pushes a pin 23d mounted on the lever 23 and fitted in the slot 27a, thus moving the lever B upwardly (FIG. 4) in the direction of the arrow B until the end 23a of the lever 23 is disengaged from the lever 21. The lever 23 and the lever 24 are then allowed to move to the right (FIG. 4) in the direction of the arrow A under the resiliency of the spring 25, whereupon the movable contact of the mode/film cartridge detecting switch 2 is shifted to the photographing mode position.

As illustrated in FIG. 2, the mode/film cartridge detecting switch 2 is part of a rotation reversing circuit for the film transport motor 1. The motor controller 4, included in the CPU 20, controls the film transport motor 1 to rotate in opposite directions and also to be stopped in response to input signals applied to the CPU 20. The motor controller 4 controls the signal levels at two signal output ports M1, M2. When the mode switch 2 is in the prewinding mode position, the motor controller 4 renders the signal output port M1 high in level and the signal output port M2 low in level, thus turning on transistors 61, 62, 63. A circuit composed of the power supply Vb, the transistor 63, the film transport motor 1, and the movable contact of the mode switch 2 in the prewinding mode position is therefore made to rotate the film transport motor 1 in one direction to prewind the film. When the mode switch 2 is in the photographing mode position, the motor controller 4 renders the signal output port M2 high and the signal output port M1 low to turn on transistors 64, 65, 66, thereby making a circuit composed of the power supply Vb, the movable contact of the mode switch 2 in the photographing mode position, the film transport motor 1, and the transistor 66. The film transport motor 1 is now rotated in the opposite direction to rewind the film into the film cartridge. The film is rewound one frame each time the shutter is released to make an exposure on the film. A mode signal MS is applied to the CPU 20 from one terminal of the film transport motor 1 which is connected to the movable contact of the mode/film cartridge detecting switch 2.

An automatic exposure and focus control circuit 68 issues an operation end signal OE when one cycle of automatic exposure and focus control operation is finished. In response to the operation end signal OE, a transistor 70 is turned on to apply one low-level pulse to a rewinding port S/E of the CPU 20. The transistor 70 is shunted by a rewinding switch 69. The rewinding switch 69 is temporarily closed immediately before the film is rewound one frame into the film cartridge, so that one low-level pulse is applied to the rewinding port S/E. The rewinding switch 69 may be operatively coupled to the camera lens that is automatically focused or the shutter, for example, such that the rewinding switch 69 may be temporarily closed immediately before the camera lens returns to its initial position or the shutter is set. Therefore, the rewinding port S/E of the CPU 20 is supplied with one pulse when the film starts being rewound one frame after a picture has been taken and one pulse when the film has been rewound one frame. Upon reception of these pulses, the CPU 20 can recognize the completion of one cycle of photographing operation.

A battery checker IC 71 is connected to a line coupled to the power supply Vc. The battery checker IC 71 generates an output signal of a low level when the voltage on the line of the power supply Vc drops below a reference voltage due to a voltage drop of the power supply Vc. The battery checker IC 71 has an output terminal connected to a transistor 72 which is turned off when the low-level output signal is produced by the battery checker IC 71. When the transistor 72 is turned off, it applies a high-level signal as a shutter lock signal SR to an INT1 terminal of the CPU 20.

The CPU 20 is connected to a liquid crystal display 72 which displays various information items dependent on the input signals from the input ports of the CPU 20.

Operation of the fail-safe film prewinder according to the present invention will be described with reference to FIG. 3.

When the camera back cover is open, the back cover switch 46 is closed to reset the CPU 20. Now, a film cartridge is loaded into the camera and the back cover is closed. With the film cartridge loaded, the mode/film cartridge detecting switch 2 is changed over to the prewinding mode position, and closing the back cover opens the back cover switch 46 to release the CPU 20 from the reset mode. At this time, the mode switch 2 is in the prewinding mode position, and the film detecting switch 12 is closed since a starting end of the film extends in the aperture of the camera. In response to the signals from these switches 2, 12, the CPU 20 now enters the prewinding mode. In the prewinding mode, the motor controller 4 in the CPU 20 renders the signal output port M1 high and the signal output port M2 low to turn on the transistors 61, 62, 63 for thereby making the circuit composed of the power supply Vb, the transistor 63, the film transport motor 1, and the movable contact of the mode switch 2 in the prewinding mode position. Therefore, the film transport motor 1 is energized to rotate in the direction to start prewinding the film.

During the prewinding mode, the CPU 20 monitors the INT1 terminal to ascertain whether a shutter lock signal SR is applied due to a drop of the power supply voltage. If the film prewinding is completed in the absence of any shutter lock signal SR, then the mode switch 2 is shifted from the prewinding mode position over to the photographing mode position, and then the CPU 20 is rendered quiescent. If a shutter lock signal SR is applied while the film is being rewound, then the CPU 20 stops the film transport motor 1, and thereafter is rendered quiescent.

It now is assumed that with the back cover closed, the barrier is opened to close the barrier switch 53, and the shutter release button is fully depressed to close the shutter release half-depression switch 49 and the shutter release switch 3. If the shutter release switch 3 is closed in the photographing mode, then the film is rewound one frame after it has been exposed. However, if the shutter release switch 3 is closed in the prewinding mode, then the film prewinding is resumed.

While the film is being prewound again as described above, the CPU 20 monitors the power supply voltage. Insofar as the power supply voltage remains higher than the prescribed reference voltage, the CPU 20 remains in the prewinding mode to prewind the film. When the prewinding mode is completed, the CPU 20 enters the photographing mode. If a shutter lock signal SR is applied due to a reduction of the power supply voltage below the reference voltage, the CPU 20 stops the film transport motor 1 again and is made quiescent. Thereafter, the CPU 20 resumes the film prewinding each time the shutter release switch 3 is closed by depressing the shutter release button.

In the prewinding mode, the relatively long film is continuously pulled out of the film cartridge by energizing the film transport motor 1 for a continuous period of time ranging from 20 to 30 seconds, for example. Therefore, if the power supply battery of the camera has been so consumed that its service life is about to end before a prewinding mode, then the battery voltage sharply drops during the subsequent prewinding mode. However, the desired battery power capability is recovered to the extent capable of transporting the film by stopping the use of the battery. For this reason, even if the film prewinding mode is interrupted by a battery voltage drop, the film can thereafter be prewound each time the shutter release button is depressed until finally the film is fully prewound.

The film prewinding mode as described above can be resumed after it has been interrupted due to a battery power supply failure at a low temperature.

Upon completion of the film prewinding mode, the camera enters the photographing mode. In the photographing mode, the film transport motor 1 is energized for quite a short period of time in the range of from 0.5 to 1 second, for example, for each exposure. Therefore, any reduction in the battery capability during the photographing mode is smaller than that in the prewinding mode, so that the battery remains powerful enough to transport the film until it is fully exposed.

The fact that the film prewinding mode is interrupted and then resumed indicates that the battery capability is lowered. Consequently, it is preferable to replace the battery with a new one after the film has fully been exposed. Interruption and subsequent resuming of the film prewinding mode thus provides an indication of warning for battery replacement.

In the illustrated embodiment, the film prewinding mode is stopped upon detection of a battery voltage drop below the reference voltage. However, the CPU 20 may be so programmed to stop the film prewinding mode when the speed of rotation of the film transport motor is lowered below a predetermined level.

Although a certain preferred embodiment has been shown and described, it should be understood that many changes and modifications may be made therein without departing from the scope of the appended claims.

We claim:

1. A fail-safe film prewinder for a camera in which film is continuously prewound from a loaded film cartridge in a film prewinding mode and thereafter is successively exposed in a photographing mode while the film is rewound one frame at a time into the film cartridge, said fail-safe film prewinder comprising:

a film transport motor rotatable in opposite directions for selectively transporting the film out of and into the film cartridge;

a mode switch for switching to the photographing mode upon completion of the prewinding mode;

a release switch actuatable in response to the depression of a shutter release button; and a motor controller for controlling said film transport motor by producing a first signal in controlling the motor to rotate in the direction to prewind the film out of the film cartridge when said mode switch is in a prewinding position and a second signal controlling said motor to rotate in the direction to rewind the film into the film cartridge when the mode switch has been switched to the photographing mode; said motor controller also producing said first signal in response to an interruption in the prewinding and said shutter release switch being actuated by said shutter release button.

2. A fail-safe film prewinder according to claim 1, wherein said mode switch has a movable contact which can be shifted in response to a change in the tension to which the film is subjected.

3. A fail-safe film prewinder according to claim 1, wherein said mode switch doubles as a switch for detecting the loaded film cartridge.

4. A fail-safe film prewinder according to claim 1, further comprising an interruption detecting circuit for detecting the reduction of the power supply voltage below a reference voltage and indicating to said motor controller the occurance of an interruption.

* * * * *

UNITED STATES PATENT AND TRADEMARK OFFICE
CERTIFICATE OF CORRECTION

PATENT NO. : 4,717,931

DATED : Jan. 5 1988

INVENTOR(S) : Keiji Himuro et al.

It is certified that error appears in the above-identified patent and that said Letters Patent is hereby corrected as shown below:

```
    On the title page

--Priority information is incorrectly recorded.
  It should read:

Jun. 26, 1985 [JP]   Japan..............60-139850--
```

Signed and Sealed this

Second Day of August, 1988

Attest:

DONALD J. QUIGG

Attesting Officer

Commissioner of Patents and Trademarks